United States Patent
Elleuch et al.

(10) Patent No.: US 8,103,782 B2
(45) Date of Patent: Jan. 24, 2012

(54) SESSION MOBILITY IN A FULL-MESH CONFERENCE USING SESSION INITIATION PROTOCOL

(75) Inventors: Wajdi Elleuch, Sherbrooke (CA); Alain Houle, Bromont (CA)

(73) Assignee: Societe de Commercialisation des Produits de la Recherche Appliquee—SOCPRA, Sciences et Genie, S.E.C., Sherbrooke, Quebec (CA)

( * ) Notice: Subject to any disclaimer, the term of this patent is extended or adjusted under 35 U.S.C. 154(b) by 49 days.

(21) Appl. No.: 12/593,771

(22) PCT Filed: Mar. 31, 2008

(86) PCT No.: PCT/CA2008/000606
§ 371 (c)(1),
(2), (4) Date: Sep. 29, 2009

(87) PCT Pub. No.: WO2008/119177
PCT Pub. Date: Oct. 9, 2008

(65) Prior Publication Data
US 2010/0121961 A1    May 13, 2010

Related U.S. Application Data

(60) Provisional application No. 60/920,780, filed on Mar. 30, 2007.

(51) Int. Cl.
G06F 15/16 (2006.01)
G06F 15/173 (2006.01)
G06F 15/177 (2006.01)

(52) U.S. Cl. ........ 709/228; 379/158; 370/260; 370/331; 370/332; 370/254

(58) Field of Classification Search ............... 709/228, 709/203–206; 379/158; 370/260, 331, 332, 370/254
See application file for complete search history.

(56) References Cited

U.S. PATENT DOCUMENTS

| 7,415,026 | B2 * | 8/2008 | Hsu et al. ............... 370/395.3 |
| 7,583,657 | B1 * | 9/2009 | Webster et al. ............ 370/352 |
| 7,715,309 | B2 * | 5/2010 | Scholl et al. ............... 370/218 |
| 2003/0149772 | A1 * | 8/2003 | Hsu et al. .................... 709/227 |
| 2005/0063324 | A1 * | 3/2005 | O'Neill et al. .............. 370/310 |

(Continued)

OTHER PUBLICATIONS

International Search Report dated Jul. 14, 2008 issued from the International Patent Application No. PCT/CA2008/000606, pp. 2-4.

(Continued)

Primary Examiner — Haresh N Patel
(74) Attorney, Agent, or Firm — Norton Rose Or LLP (57) ABSTRACT

There is described a method for enabling session mobility in a multi-participant IP-based multi-media communication network in full-mesh conference model, the method comprising: mapping a full-mesh communication protocol to a Session Initiation Protocol (SIP); defining an extended message protocol including new message mechanisms to support session mobility options; mapping the extended message protocol to the Session Initiation Protocol; and adding headers to mapped messages from the extended message protocol and from the full-mesh communication protocol to comply with full-mesh message signalization protocol mechanisms.

20 Claims, 7 Drawing Sheets

U.S. PATENT DOCUMENTS

| | | | |
|---|---|---|---|
| 2005/0207361 A1* | 9/2005 | Rosenberg et al. | 370/282 |
| 2006/0034195 A1* | 2/2006 | Blaiotta et al. | 370/261 |
| 2006/0239253 A1* | 10/2006 | Gallant et al. | 370/352 |
| 2007/0070948 A1* | 3/2007 | Kezys et al. | 370/331 |
| 2007/0165810 A1* | 7/2007 | Nguyen et al. | 379/158 |
| 2007/0274229 A1* | 11/2007 | Scholl et al. | 370/254 |
| 2008/0037447 A1* | 2/2008 | Garg et al. | 370/260 |
| 2008/0069011 A1* | 3/2008 | Sekaran et al. | 370/260 |
| 2008/0076422 A1* | 3/2008 | Lin | 455/436 |
| 2008/0159232 A1* | 7/2008 | Thalanany et al. | 370/332 |
| 2008/0205342 A1* | 8/2008 | Radhakrishnan et al. | 370/331 |
| 2010/0172361 A1* | 7/2010 | Scholl et al. | 370/401 |
| 2010/0235464 A1* | 9/2010 | Iyer et al. | 709/217 |

OTHER PUBLICATIONS

Lennox, J., "Services for Internet Telephony", Ph. D. Dissertation, Columbia University, 2004 (Retrieved from the Internet: http://www1.cs.columbia.edu/~lennox/thesis.pdf), pp. 118 to 141, Chapter 8, Dec. 31.

Lennox et al., "A Protocol for Reliable Decentralized Conferencing", NOSSDAV'03,k Monterey, California, USA, Jun. 1-3, 1003 (retrieved from the Internet: http://www1.cs.columbia.edu/~lennox/fullmesh.pdf), entire document, Jun. 1-3, 2003 pp. 1-10.

* cited by examiner

| Layers | Examples |
|---|---|
| User | Sip Address, E-Mail |
| Application | SipFone, Skype, MSN |
| Service | VoIP, MMoIP, conferencing, IM, Presence |
| Session | SIP, H323, RTP |
| Transport, Network | TCP/IP address |
| Link | Ethernet Address |

Personal Mobility: User, Application, Service, Session
Terminal Mobility: Transport/Network, Link

| MESSAGE PROTOCOL MAPPING TO SIP | | |
|---|---|---|
| Abstract message | SIP method | Added header |
| JOIN | INVITE | Conference-Id |
| | | Conference-Member |
| CONNECT | INVITE | Conference-Id |
| | | Invited-by |
| UPDATE | REINVITE | Conference-Id |
| | UPDATE | Conference-Member |
| OK | 2xx | Conference-Id |
| | | Conference-Member |
| ACK | ACK | Conference-Id |
| | | Conference-Member |
| LEAVE | BYE or CANCEL | Conference-Id |
| REJECT | 4xx, 5xx or 6xx | Conference-Id |

EXTENDED MESSAGE PROTOCOL MAPPED TO SIP

| Abstract message | SIP method | Added header |
|---|---|---|
| MEDIA-JOIN | INVITE | Conference-ID |
|  |  | Conference-Member |
| JOIN-REFER | REFER | Conference-ID |
|  |  | Conference-Members |
| CONNECT-REPLACE | INVITE | Replaces |
|  |  | Conference-ID |
|  |  | Invited-by |
|  |  | Conference-Members |
| CONNECT-NOTIFY | NOTIFY | Conference-ID |

SESSION MOBILITY IN A FULL-MESH CONFERENCE USING SESSION INITIATION PROTOCOL

CROSS-REFERENCE TO RELATED APPLICATIONS

The present application claims priority under 35 USC §119(e) of Provisional Patent Application bearing Ser. No. 60/920,780, filed on Mar. 30, 2007.

TECHNICAL FIELD

The present invention relates to the field of moving sessions from one device to another during multiparty communications.

BACKGROUND OF THE INVENTION

Communication devices, whether handheld or not, are known to have varying capabilities, enabling different levels of support for large multimedia services, applications, and IP-based wireless and wired connectivity. Users of handheld devices can move within a wireless domain and enjoy spatial mobility while using multimedia services. However, handheld devices are still limited in term of autonomy, display capacity, ease of use and computational power. Stationary devices, like PC or wire-line IP-Phones, continue to be more adapted for multimedia services, but not spatial mobility.

Enabling service transitions between all available user-devices allows one to take advantage of the capabilities offered by different types of devices. Service transfer between different communicating devices can be supported by ensuring some mobility in the application-session layer. Solutions exist to enable session mobility between multimedia applications within two-party communication. In the case of multiparty communications, moving a session from one device to another device is more complex. In some cases other participants in the communication are affected, which makes the procedure burdensome. For example, in situations where users join the conference or leave it, the transferred session host needs to be informed about such events and conference coherence has to be maintained.

Several approaches and topologies have been proposed for distributed Internet multiparty communication. Some of them are centralized approaches using a conference server that carries out signaling/media-mixing between participants. One centralized approach aims to enable one participant of a two-party communication to invite other users and to ensure media mixing and conference signaling. A second centralized approach intends to dedicate conference media mixing and/or session signaling management to a central third-party machine. The major drawback of these two approaches is that as soon as the central element leaves the conference, there is no way for remaining participants to continue conferencing. Some decentralized approaches use the multicast techniques to create network links between participants. This model is based on the IP multicast technique where each active participant should use multicast addresses that contain the addresses of participants to join. Over and above overloading networks, this approach requires routers to be multicast-enabled. Therefore, deploying multicast conferences outside local networks is not conceivable.

Therefore, there is a need for a new model that will allow session mobility in multiparty communication environments.

SUMMARY OF THE INVENTION

There is described herein a method and system for enabling session mobility in a full-mesh conference model using the Session Initiation Protocol. A new session-based IP communication layering model is provided.

In accordance with a first broad aspect of the present invention, there is provided a method for enabling session mobility in a multi-participant IP-based multi-media communication network in full-mesh conference model, the method comprising: mapping a full-mesh communication protocol to a Session Initiation Protocol (SIP); defining an extended message protocol including new message mechanisms to support session mobility options; mapping the extended message protocol to the Session Initiation Protocol; and adding headers to mapped messages from the extended message protocol and from the full-mesh communication protocol to comply with full-mesh message signalization protocol mechanisms.

In accordance with another broad aspect of the present invention, there is provided a method for managing a conference in a multi-participant IP-based multi-media communication network in a full-mesh conference model, the method comprising: creating and managing a plurality of sessions from a first terminal at a first node of the network to a plurality of other terminals in the network using a Session Initiation Protocol (SIP); receiving a request to transfer at least part of the sessions from the first terminal to a second terminal; and transferring at least part of the sessions to the second terminal using SIP messages from an extended message protocol mapped to SIP, at least some of the SIP messages having a Conference-ID header to identify a conference participant.

In accordance with yet another broad aspect of the present invention, there is provided a terminal for participating in an IP-based multi-media communication network in a full-mesh conference model comprising a computer readable medium storing software instructions for controlling the terminal to: communicate with other terminals using a Session Initiation Protocol (SIP), thereby creating and managing a plurality of sessions with the other terminals; and transfer at least part of the sessions to a second terminal using SIP messages from an extended message protocol mapped to SIP, at least some of the SIP messages having a Conference-ID header to identify a conference participant.

BRIEF DESCRIPTION OF THE DRAWINGS

Further features and advantages of the present invention will become apparent from the following detailed description, taken in combination with the appended drawings, in which.

DETAILED DESCRIPTION

There is described herein a method for enabling session mobility in full mesh conferencing models. The method uses the Session Initiation Protocol (SIP), which is an application layer control protocol for creating, modifying, and terminating sessions with one or more participants and is involved in the signaling portion of a communication session. SIP is designed to be independent of the underlying transport layer, and can run on TCP (Transmission Control Protocol), UDP (User Datagram Protocol), or SCTP (Stream Control Transmission Protocol).

Full mesh conferencing is a network architecture in which each end point is capable of reaching any other end point directly through a point-to-point connection. No central point or central server is present to manage the communication as each node may communicate directly with any other node in the network. In the full mesh model, each endpoint pair is linked directly together with a separate dialog (or session). Therefore, for N conference participants, each member needs to create and to manage (N-1) signaling dialogs. Received (N-1) media flows are mixed locally by each node. The output media flows are duplicated and split through each conferencing session. Each node participating in full mesh conferencing manages both signaling and media traffic.

Figure 1:
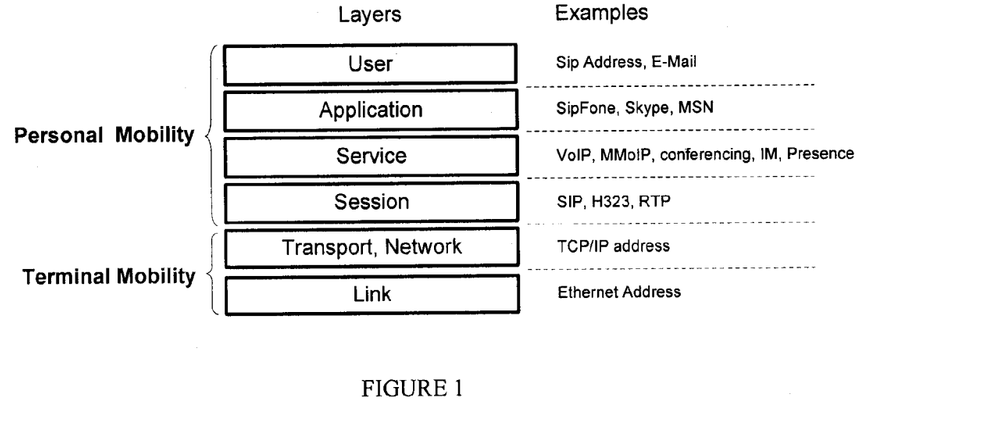
FIG. 1 illustrates session-based IP communication layers.

Session mobility is one of the four types of mobility found in the application layer of a communication model, which is the layer that defines the language and syntax that programs use to communicate with other programs. The other types of mobility are terminal mobility, personal mobility and service mobility. While terminal mobility allows a device to continue using services while moving between IP (Internet Protocol) subnets, the three other mobility layers focus on providing service to the user while moving between available devices. FIG. 1 illustrates a layered communication model showing the different layers present in session-based IP communication layering. The user, application, service, and session layers are used in service mobility, while the transport/network and link layers are used in terminal mobility. Examples for each layer are also shown in FIG. 1.

User-level mobility enables users to be uniquely identified and to be contacted from anywhere and using a variety of communication media. Each user is identified by a unique ID (Personal Online IDs—POID) and uses a personal proxy that can track and manage the movement of the user with or without his device. Using SIP for Multimedia over IP services, users can be identified by their SIP URI (Uniform Resource Identifier) address while their devices continue to be identified by their IP address. To represent the user level mobility, the layered communication model needs to have the final user on top, as shown in FIG. 1.

The term "session" is used to describe the media relationship used between participating peers. Session-based services are supported by applications located above the session layer. The session layer plays the role of a middleware solution between the upper application and the lower network layers, as presented on FIG. 1. The aim of the presented layered model is to reduce the various session and dialog management overhead for the application/service designer. At the same time, the application layer can use the lower service layers either individually or by combining them into a single advanced service. As an example, the presence service, when combined with an instant messaging service, offers a service allowing users to exchange text messages with others while staying aware of their presence status. Also, it should be noted that service mobility is also bonded to the session mobility. Enabling session mobility between devices has an impact on all the upper layers.

Figure 2:
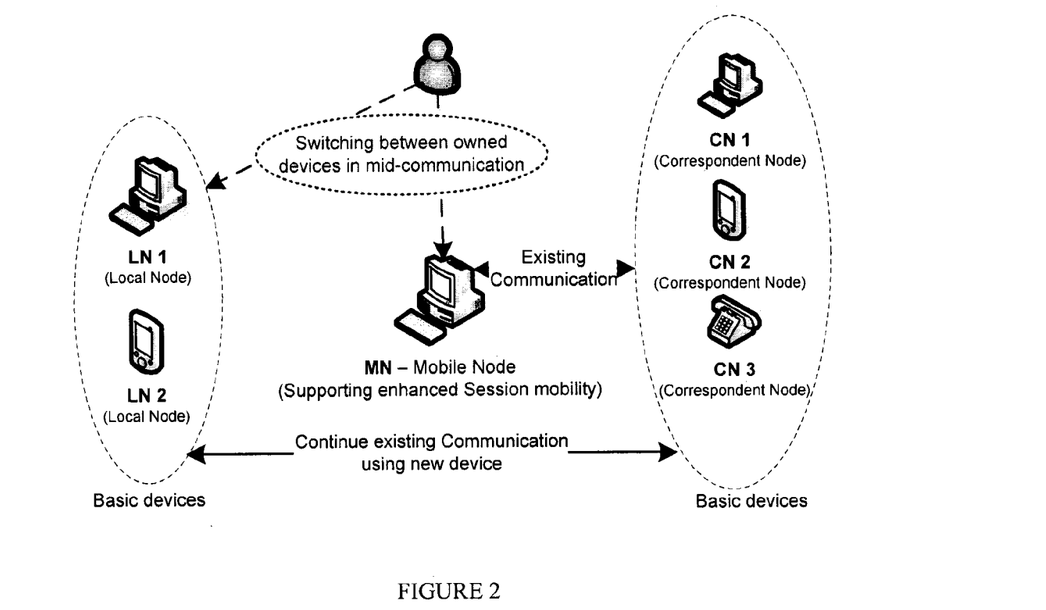
FIG. 2 is a schematic showing a transfer of communications in a network, in accordance with an embodiment.

FIG. 2 shows the architecture of the system, in accordance with one embodiment. The Correspondent Nodes (CNs) are basic multimedia devices participating in a conference with the Mobile Node (MN). The MN is a device that has the capabilities to handle session mobility. At anytime, the MN can move its active sessions to another available Local Node (LN). The MN can use a service location directory to discover nearby available LNs. Participating nodes have to be full mesh enabled devices to take part in the conference. LNs can be basic devices or session mobility-enabled to preserve system interoperability and compatibility. All session mobility-enabled devices can act as a MN by transferring sessions to other devices.

The "transfer" of a session is understood as moving an active session from a first device to one or more other devices. The "retrieval" of a session is understood as the transfer of a session currently on another device back to a first device. For example, a user in videoconference communication with his handheld device enters a new location where more adapted video display/acquisition devices are available. In this case, the user can transfer a video session to these devices. Before walking away, he can retrieve the video stream to his mobile device for continued communication.

Session media may either be transferred completely to a single device or be split across multiple devices. For instance, a user may only wish to transfer the video portion of his session while maintaining the audio portion on his Personal Digital Assistant (PDA). Alternatively, he may find separate video and audio devices and may wish to transfer one media service to each of them. Furthermore, even the two directions of a full-duplex session may be split across devices. For example, a PDA's display may be too small for a good view of the other call participant, so the user may transfer video output to a projector and continue to use the PDA camera.

Two different modes are possible for session transfer: Mobile Node Control mode and Session Handoff mode. In Mobile Node Control mode, a signaling session (dialog) is established with each device used in the transfer. The MN updates its session with the CN using Session Description Protocol (SDP) parameters to establish media sessions between the CN and each device, consequently replacing the current media session with the CN. This approach requires the MN to remain active to maintain sessions. Session Handoff mode completely transfers the session signaling and media to another device. A user may want to transfer a session completely because the battery on his mobile device is running out. In another case, the user of a static device that leaves the area and wishes to transfer the session to his mobile device will not want the session control to remain on the static device when he is away. This could allow others to easily tamper with his call. In such case, Session Handoff mode, is useful.

A communication session may consist of a number of media types, and a user should be able to transfer any of them to his chosen device. Audio and video are carried by standardized protocols like Real Time Protocol (RTP) and negotiated in the body part of the signaling messages and encoded in a format like SDP. Any example given for audio and video will work similarly for text, as only the payloads differ.

Figure 3:
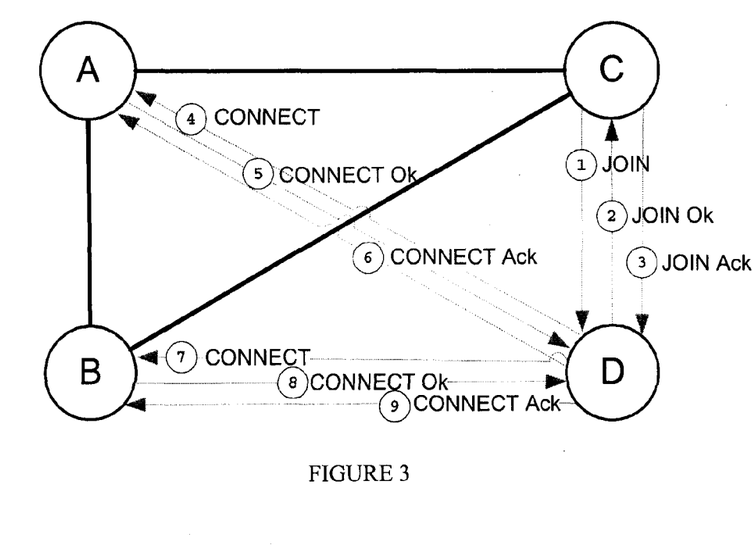
FIG. 3 shows an example of using a full mesh abstract protocol message to include participant D in the established conference between A, B and C.

A basic protocol exists for decentralized conferencing, as described in Lennox, J., Schulzrinne, H., "A Protocol for Reliable Decentralized Conferencing", International Workshop on Network and Operating System Support for Digital Audio and Video, 2003. This protocol is based on some abstract messages that can be sorted in three categories: request messages (JOIN, CONNECT, LEAVE, and UPDATE), response messages (OK, with the possibility to use Reject response for JOIN and CONNECT) and acknowledgment response (ACK) for messaging transaction initiated by JOIN or CONNECT requests. While the JOIN message is used by conference members to add new users, the CONNECT message is used by invited users to establish communication with the remaining conference members. These two messages are based on the three phase messaging transaction (request/response/acknowledgment). The UPDATE message can be used to inform each participant of new information about the conference membership list. The LEAVE message terminates the dialog. FIG. 3 shows an example of using the full mesh abstract protocol message to include the participant (D) in the established conference between A, B and C.

To implement the full mesh protocol in SIP, the full mesh protocol's abstract methods are mapped to concrete SIP methods. As both JOIN and CONNECT establish dialogs in the abstract protocol, they are both mapped to the SIP INVITE method. For similar reasons, LEAVE is mapped to either BYE or CANCEL, depending on the state of the dialog when it is invoked, the UPDATE method can be mapped either to a re-INVITE or to a newly-defined SIP method. The two subsequent phases of the connection process map naturally: OK becomes a 2xx-class success response, REJECT becomes a 4xx, 5xx, or 6xx-class failure response, and ACK is ACK.

Figure 4:
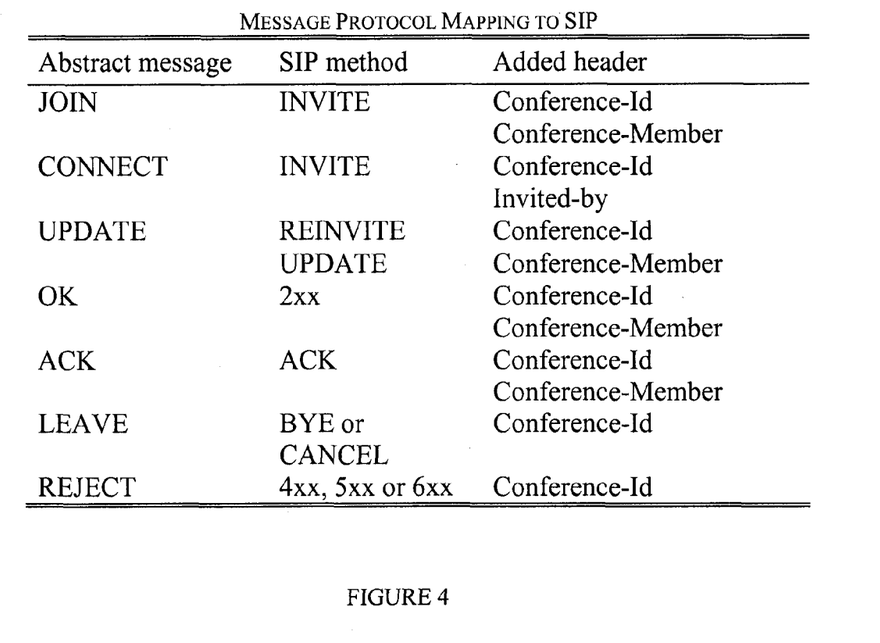
FIG. 4 is a table illustrating a mapping of a full mesh abstract protocol to SIP, in accordance with an embodiment.

The implementation of the full mesh messaging protocol involves introducing new headers. Each message indicates the conference identification information by using a new Conference-ID header. Each full mesh conference is then uniquely identified by an ID. This ID is generated by the initial conference creator and by possibly using the same procedure as that used to generate the value of the Call-ID field. The Invited-By header can be included on the CONNECT message, and used by the new added participant to specify the identity of the user that invited him (the basic SIP Contact header can be used to identify each participant). A Conference-Member list may be exchanged by participants and can be provided using new Conference-Member header field. FIG. 4 presents an embodiment for the message mapping and extra-header that are added.

In order to support session mobility options, basic messages used to create and manage full mesh conferencing are extended. In accordance with one embodiment, four new message mechanisms that can be used to complete messages presented in FIG. 4 are: MEDIA-JOIN/OK/ACK, JOIN-REFER/OK, CONNECT-REPLACE/OK/ACK and CONNECT-NOTIFY/OK.

Figure 5:
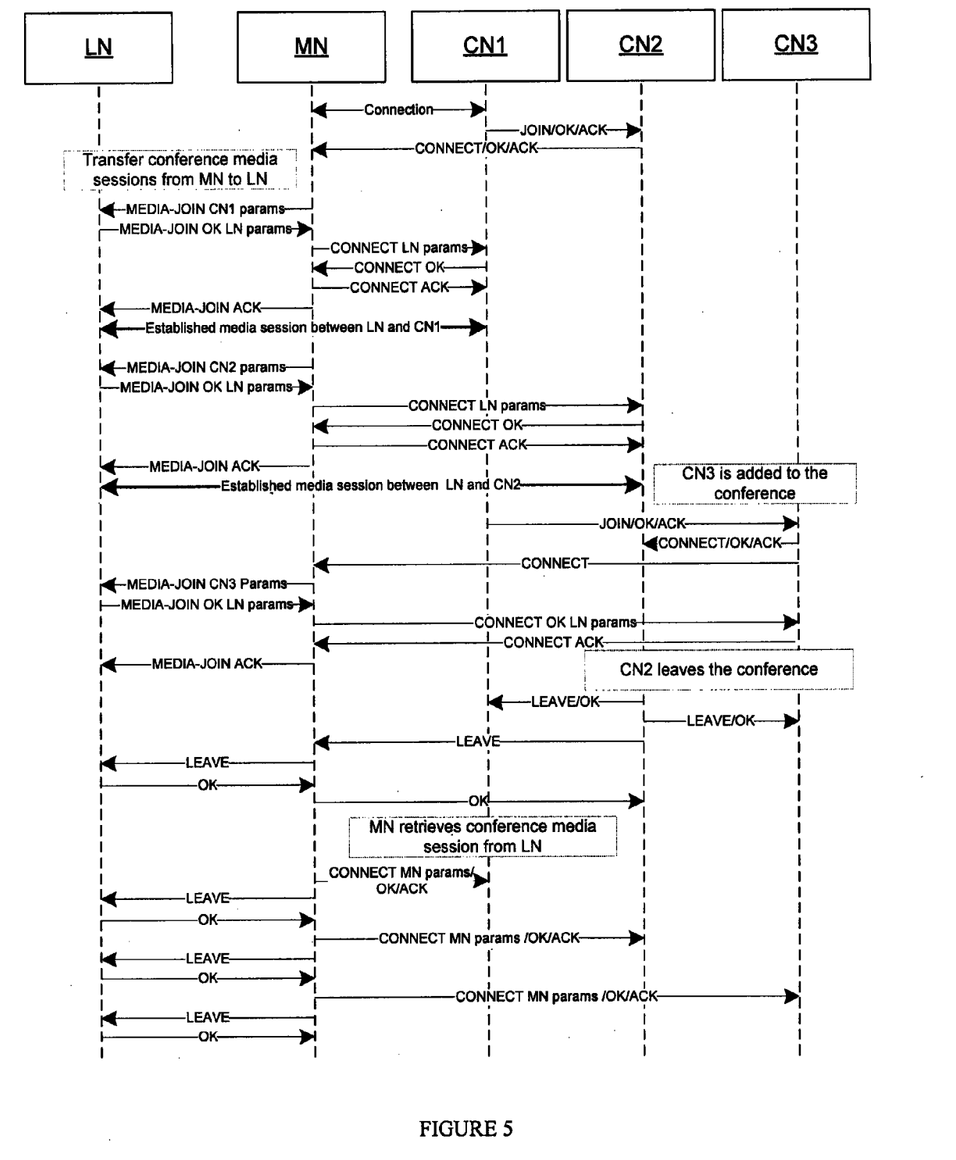
FIG. 5 illustrates a message flow for mobile node control node in full-mesh, in accordance with an embodiment.
Figure 6:
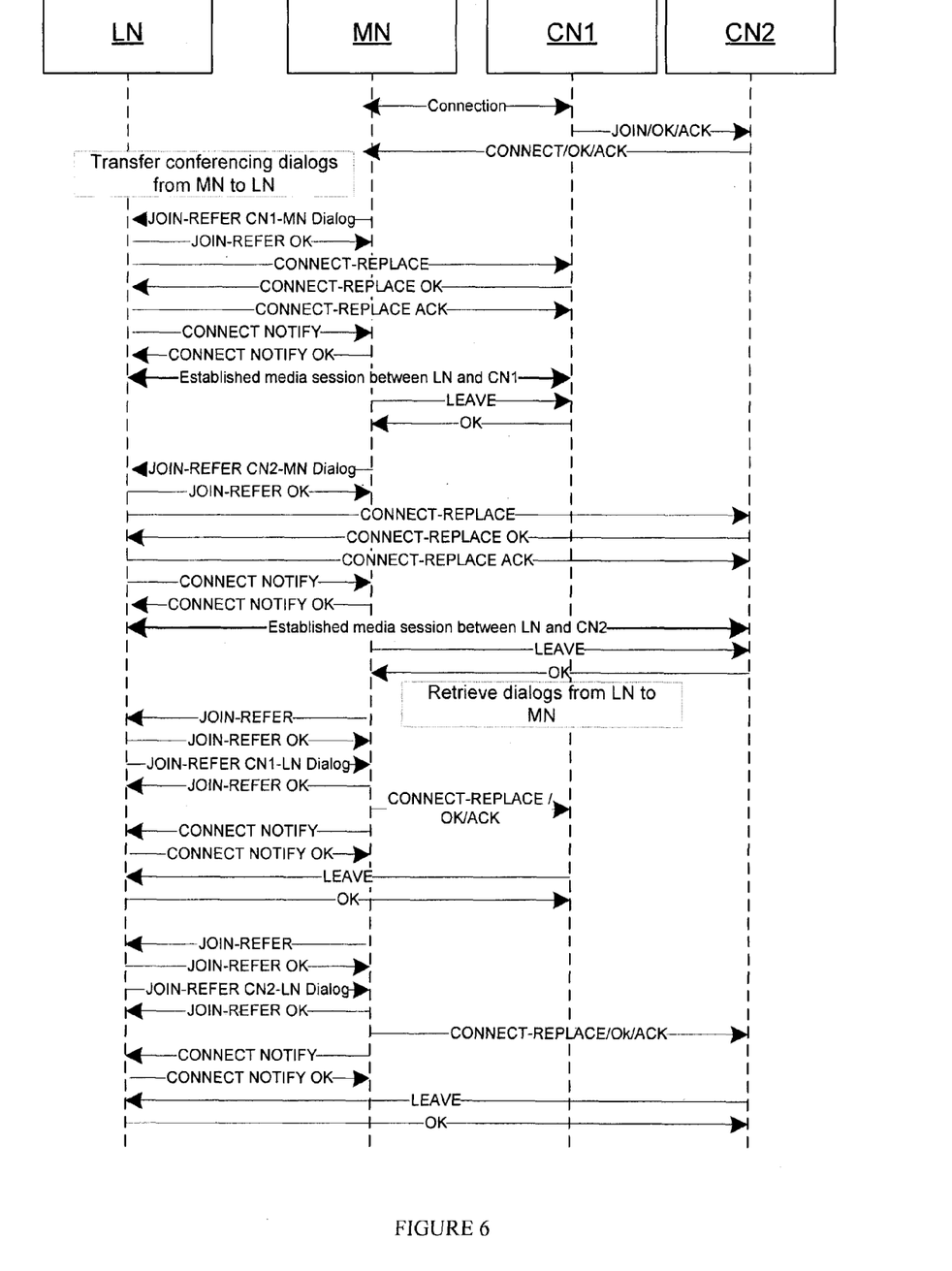
FIG. 6 illustrates a message flow for session handoff mode in full-mesh, in accordance with an embodiment.

The types of events that can generate message traffic for the conference are defined as follows: when a session is transferred, when a session is retrieved, when a user is added to the conference, and when a user leaves the conference. FIGS. 5 and 6 show respectively the message flow that can be exchanged between participant nodes for Mobile Node Control mode and Session Handoff mode using all of these types of events (when possible).

FIG. 5 illustrates a proposed message flow for Mobile Node Control mode. The MEDIA-JOIN message is used in this mode when the MN needs to transfer a part of or the whole active media session to one or several LN. The MEDIA-JOIN mechanism is based on the three phases messaging transaction. It's used jointly with the CONNECT mechanism to permit media negotiation between LN and each CN within dialogs controlled by MN. A MEDIA-JOIN response can be positive (OK response), or negative (REJECT response). A MEDIA-JOIN message containing connection parameters for CN1 is initially sent to the LN. The LN responds by sending its own connection parameters to the MN in a MEDIA-JOIN OK message. The MN then transmits the LN connection parameters to $CN_1$ in a CONNECT message. $CN_1$ responds with an OK message and the MN acknowledges reception of the response. The MN then acknowledges the connection to the LN and a session is established between LN and $CN_1$. This process is repeated for all $CN_i$ terminals. To retrieve the session, the MN sends a CONNECT message to each $CN_i$ terminal with its parameters and then instructs the LN to leave the conference.

FIG. 6 illustrates an embodiment for message flow for Session Handoff mode. It differs from that illustrated in FIG. 5 mainly by the absence of the steps for retrieving the conference media session from LN. The JOIN-REFER message request is used by the MN to ask the LN to replace its current session with each $CN_i$. The existing dialog parameter between MN and $CN_i$ is included on the JOIN-REFER message and used by LN when requesting dialog substitution within CONNECT-REPLACE messages. The dialog replacement result can be reported to MN using CONNECT_NOTIFY message. If the notification indicates positive transfer response, MN can then proceed by terminating its dialog with the specified CN by sending a LEAVE message. JOIN-REFER can also be used by MN as a "nested REFER" to request LN for another REFER. This can be useful to let MN retrieve dialog from LN on the Session Handoff mode. This Dialog transfer procedure between MN and LN is repeatedly applied to include all $CN_i$ participants.

The transferred full mesh conference sessions may be considered as a global transaction resulting from a set of individual session transfers between MN and each $CN_i$. Note that the Mobile Node Control mode is affected by adding/removing conference participant events. In this case, MN needs to forward each received CONNECT or LEAVE request to LN. MN will subsequently give a response to these requests as soon as it receives a response from LN. Possibly, acknowledgements received from added participants, as a result of such transactions, may also be routed to LN to maintain the MN-LN dialog coherence.

The basic abstract protocol described above can be expressed in actual SIP messages. The MEDIA-JOIN message can be mapped to the INVITE SIP message. OK messages can be mapped to 2xx class success response and negative REJECT message will be 4xx, 5xx or 6xx class failure responses. The ACK acknowledgement remains the same. JOIN-REFER request, used to initiate Session Handoff mode, can be mapped to the SIP REFER message. Refer-To and Referred-By message headers included in the REFER message are used by LN to send the CONNECT-REPLACE request to CN. CONNECT-REPLACE can be mapped to INVITE SIP containing a Replaces header. The Replaces header is used to identify the existing dialog that should be replaced by the new dialog. Finally, CONNECT-NOTIFY can be mapped on the NOTIFY SIP message. Response abstract messages, such as OK or REJECT, are mapped identically as indicated in basic full mesh message protocol described above.

Figure 7:
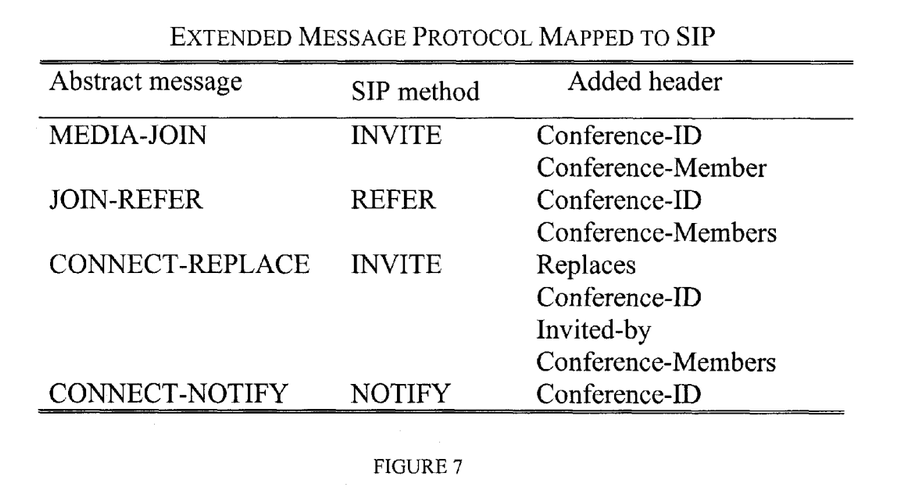
FIG. 7 is a table illustrating a mapping of an extended message protocol to SIP, in accordance with an embodiment.

To comply with existing full mesh message signalization protocol mechanisms, some headers are added to the mapped messages. The MEDIA-JOIN, mapped to SIP INVITE should include a Conference-ID header. In this way, LN will be able to understand that SIP dialogs, shared with MN, are linked to the same conference. In that case, LN needs to handle these sessions in conference mode where all output audio media streams, for example, need to be mixed. On the Session Handoff Mode, the CONNECT-REPLACE message sent from LN to CN includes a Conference-ID header that identifies the existing conference in which LN would like to participate. Some other headers like Conference-Member and Invited-By can be used to maintain coherence within the conference mechanism. The values of these headers are transmitted by the MN on the JOIN-REFER message. FIG. 7 is a table illustrating the message mapping and extra headers that may be added, in accordance with one embodiment.

Figure 8:
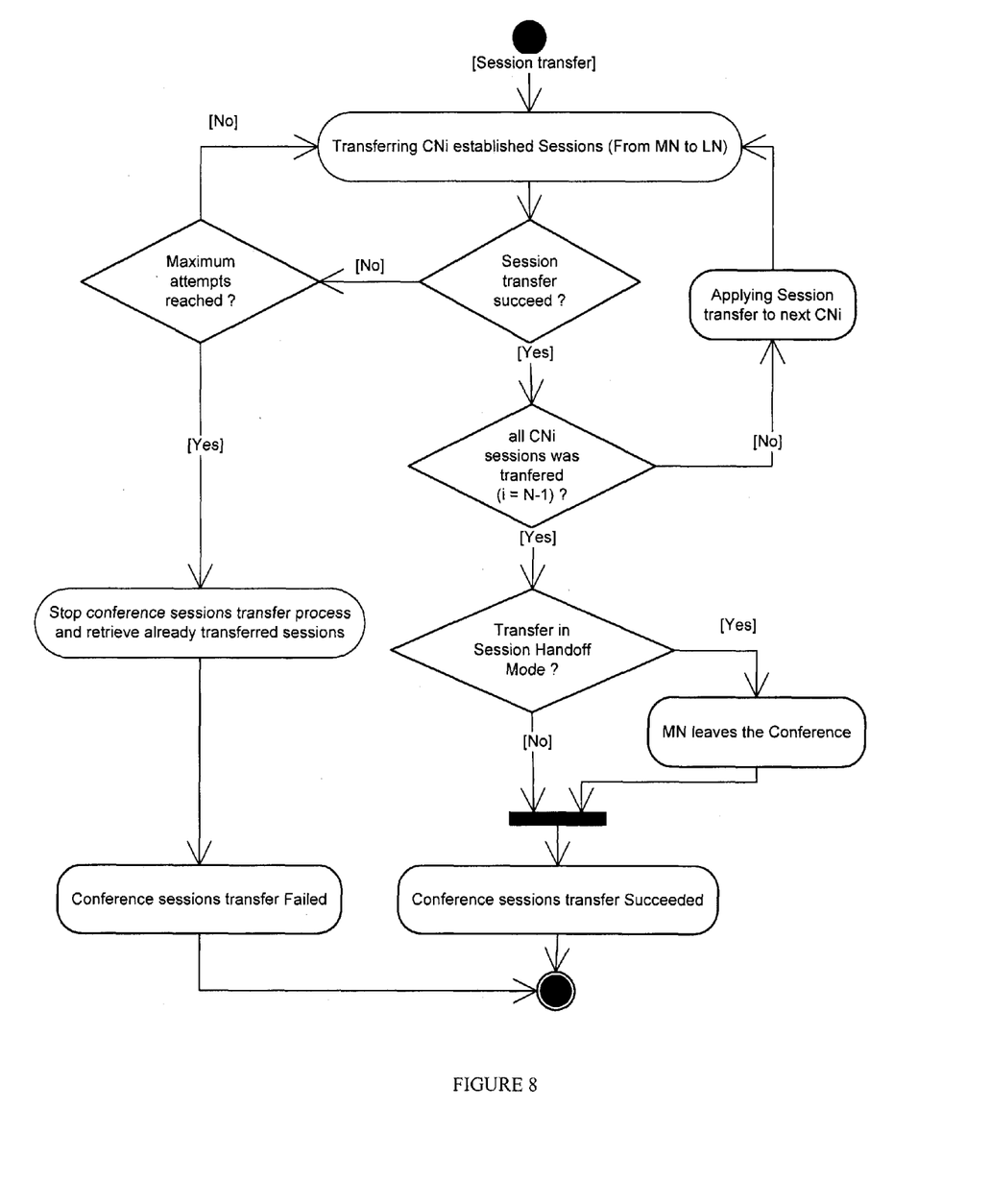
FIG. 8 is a flow chart showing a session transfer procedure according to one embodiment.

Conference Session transfers for both modes involve transferring all established $CN_i$ sessions with MN. During these session transfers, MN proceeds by transferring session by session for all (N-1) conference participant nodes. Sometimes, session transfers can fail for many reasons such as network problems or no common media codec found. In these cases, MN can proceed by retrying the transfer operation until reaching a maximum number of attempts. If session transfer fails, despite retrying, the session transfer process may be canceled and already transferred sessions are retrieved. FIG. 8 shows an embodiment of a session transfer flow chart that can be used for managing the conference session transfer operation for both modes.

Figure 9:
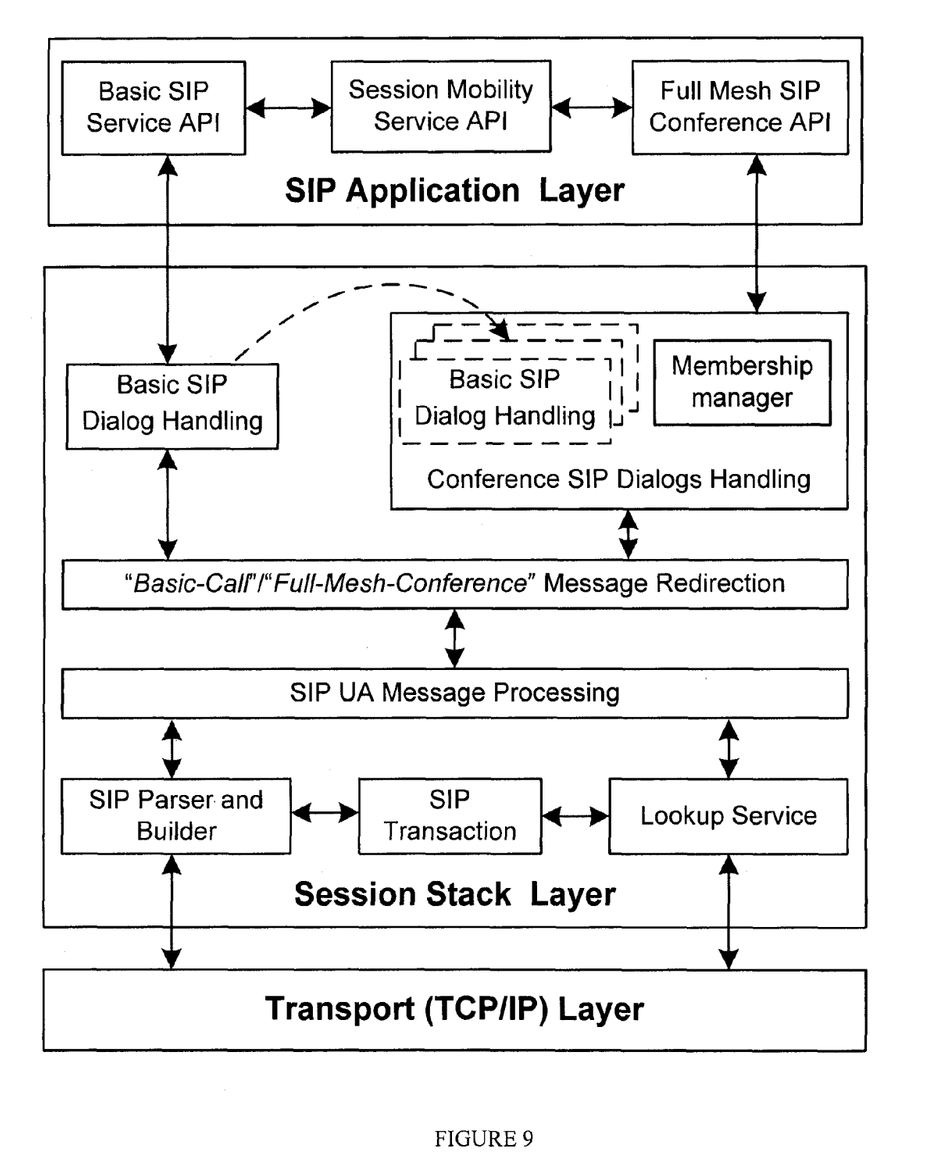
FIG. 9 is a diagram illustrating component interaction in a layered application, in accordance to an embodiment.

FIG. 9 illustrates component interaction in a layered application. In full mesh communication, each conference maintains a set of dialogs, handled individually by the dialog handling manager. To support full mesh conference, it's possible to extend the SIP application layer by adding special processing for dialogs belonging to each conference. However, such a solution reduces global service performance by introducing extra processes when each SIP message needs to reach the application layer before being identified as a member of the specified conference dialog. In one embodiment of the present system, a new component is introduced in the Stack layer to redirect messages directly to the appropriate Dialog Handler (basic or conference dialog handler). This component, called Basic-call/Full-Mesh Conferencing Message Redirection, checks the existence of a Conference-ID message header before redirecting a message. For each new received Conference-ID identifier number, a new Conference SIP Dialogs Handling is created. The "Conference-Members" header may be analyzed by the Membership manager integrated within the Conference SIP Dialogs Handling. This handler can call a new instantiation of Basic SIP dialog handling component if a new member needs to be added to the conference.

Session mobility options for the two modes can be implemented on the Application layer when the underlying SIP Session Stack complies with the latest IETF SIP RFC. For example, Replaces header included in SIP INVITE or Refer-To and Referred-By headers included in SIP REFER should be supported by the Basic SIP Dialog Handling component.

A session mobility service API may be added as a separate component to permit its simultaneous use by Basic SIP Service API. This ensures session mobility for the two-party communication model and for the Full Mesh API Conference API of the Multiparty full mesh communication model.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment. It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

We claim:

1. A method for transferring sessions between terminals of a given participant in a full-mesh conference operated over a multi-participant IP-based communication network, the method comprising use of a processing unit for:

creating and managing a plurality of sessions from a first terminal of the given participant at a first node of said network to a plurality of terminals of other participants in said network using a Session Initiation Protocol (SIP);

receiving a request to transfer at least part of said sessions from said first terminal of the given participant to a second terminal of the given participant; and transferring at least part of said sessions to said second terminal of the given participant using SIP messages from an extended message protocol mapped to SIP, at least some of the SIP messages having a Conference-ID header to identify a conference participant, wherein said transferring comprises:

requesting said second terminal, from said first terminal, to replace said first terminal in its session with a third terminal;

requesting said third terminal, from said second terminal, substitute said first terminal with said second terminal in its session with said first terminal; and notifying said first terminal, from said second terminal, that a substitution has occurred at said third terminal.

2. A method as claimed in claim 1, wherein said extended message protocol comprises at least four new message mechanisms as follows: MEDIA-JOIN/OK/ACK, JOIN-REFER/OK, CONNECT-REPLACE/OK/ACK and CONNECT-NOTIFY/OK.

3. A method as claimed in claim 1, wherein at least some of the SIP messages comprise a Conference-Members header and an Invited-By header.

4. A method as claimed in claim 1, wherein said Conference-ID headers comprises a REPLACES header in at least one of said messages in SIP.

5. A method as claimed in claim 1, wherein said extended message protocol comprises a MEDIA-JOIN message mapped to a SIP INVITE message, a JOIN-REFER message mapped to a SIP REFER message, a CONNECT-REPLACE message mapped to a SIP INVITE message, and a CONNECT-NOTIFY message mapped to a SIP NOTIFY message.

6. A method as claimed in claim 1, further comprising terminating said sessions once said transfer to said second terminal has been completed.

7. A method as claimed in claim 1, wherein said receiving a request comprises receiving a manual request input into said first terminal.

8. A method as claimed in claim 1, wherein said receiving a request comprises receiving an automated request from said second terminal.

9. A method for transferring sessions between terminals of a given participant in a full-mesh conference operated over a multi-participant IP-based communication network, the method comprising use of a processing unit for:

creating and managing a plurality of sessions from a first terminal of the given participant at a first node of said network to a plurality of terminals of other participants in said network using a Session Initiation Protocol (SIP);

receiving a request to transfer at least part of said sessions from said first terminal of the given participant to a second terminal of the given participant; and transferring at least part of said sessions to said second terminal of the given participant using SIP messages from an extended message protocol mapped to SIP, at least some of the SIP messages having a Conference-ID header to identify a conference participant wherein said transferring at least part of said sessions comprises:

transferring connection parameters of a third terminal to said second terminal from said first terminal;

receiving connection parameters of said second terminal at said first terminal;

transferring the connection parameters of said second terminal to said third terminal from said first terminal; and establishing a session between said second terminal and said third terminal and said third terminal using said connection parameters, the session allowing interaction between the second terminal and the third terminal within a dialog controlled by the first terminal.

10. A method as claimed in claim 9, further comprising retrieving said sessions from said second terminal.

11. A method as claimed in claim 9, wherein said extended message protocol comprises at least four new message mechanisms as follows: MEDIA-JOIN/OK/ACK, JOIN-REFER/OK, CONNECT-REPLACE/OK/ACK and CONNECT-NOTIFY/OK.

12. A method as claimed in claim 9, wherein at least some of the SIP messages comprise a Conference-Members header and an Invited-By header.

13. A method as claimed in claim 9, wherein said Conference-ID header comprises a REPLACES header in at least one of said messages in SIP.

14. A method as claimed in claim 9, wherein said extended message protocol comprises a MEDIA-JOIN message mapped to a SIP INVITE message, a JOIN-REFER message mapped to a SIP REFER message, a CONNECT-REPLACE message mapped to a SIP INVITE message, and a CONNECT-NOTIFY message mapped to a SIP NOTIFY message.

15. A terminal for transferring sessions of a given participant in a full-mesh conference over an IP-based communication network, the terminal comprising a processing unit and a computer readable medium storing software instructions which when executed by the processing unit to:

communicate with terminals of other participants using a Session Initiation Protocol (SIP), thereby creating and managing a plurality of sessions with said other terminals;

transfer at least part of said sessions to a second terminal of the given participant using SIP messages from an extended message protocol mapped to SIP, at least some of the SIP messages having a Conference-ID header to identify a conference participant, wherein said transfer comprises:

requesting said second terminal, from said first terminal, to replace said first terminal in its session with a third terminal;

requesting third terminal, from said second terminal, to substitute said first terminal with said second terminal in its session with said first terminal; and notifying said first terminal, from said second terminal, that a substitution has occurred at said third terminal.

16. A terminal as claimed in claim 15, further comprising software instructions executable by the processing unit to terminate sessions once said transfer to said second terminal has been completed.

17. A terminal as claimed in claim 15, further comprising software instructions executable by the processing unit to retrieve said sessions from said second terminal.

18. A terminal as claimed in claim 15, wherein said SIP messages from an extended message protocol are taken from the group comprising of: MEDIA-JOIN/OK/ACK, JOIN-REFER/OK, CONNECT-REPLACE/OK/ACK and CONNECT-NOTIFY/OK.

19. A terminal as claimed in claim 15, wherein said instructions to transfer at least part of said sessions comprise instructions for:

transferring connection parameters of a third terminal to said second terminal from said first terminal; and transferring connection parameters of said second terminal to said third terminal from said first terminal.

20. A terminal as claimed in claim 15, wherein said instructions to transfer at least part of said sessions comprise instructions for requesting said second terminal to replace said first terminal in its session with a third terminal.

* * * * *